United States Patent [19]
Cohen

[11] 4,181,405
[45] Jan. 1, 1980

[54] HEAD-UP VIEWING DISPLAY

[75] Inventor: Edwin Cohen, Binghamton, N.Y.

[73] Assignee: The Singer Company, Binghamton, N.Y.

[21] Appl. No.: 931,299

[22] Filed: Aug. 7, 1978

[51] Int. Cl.² .............................................. G02F 1/13
[52] U.S. Cl. .......................................... 350/331; 2/6; 350/174; 350/239
[58] Field of Search ................ 350/331, 174, 239; 2/6; 35/12 N

[56] References Cited

U.S. PATENT DOCUMENTS

| | | | |
|---|---|---|---|
| Re. 28,847 | 6/1976 | Vizenor | 350/174 X |
| 3,060,308 | 10/1962 | Fortuna | 351/158 X |
| 3,290,539 | 12/1966 | Lamorte | 313/500 X |
| 3,463,885 | 8/1969 | Upton | 179/1 R |
| 3,501,676 | 3/1970 | Adler et al. | 313/500 X |
| 3,555,335 | 1/1971 | Johnson | 313/499 |
| 3,612,651 | 10/1971 | McCurdy | 350/145 |
| 3,621,838 | 11/1971 | Harding et al. | 351/158 X |
| 3,712,714 | 1/1973 | Uyeda et al. | 350/301 |
| 3,853,395 | 12/1974 | Yevick | 353/27 |
| 3,882,355 | 5/1975 | deWitt | 315/169 TV |
| 3,893,149 | 7/1975 | Grenon | 357/17 |
| 3,915,548 | 10/1975 | Opittek et al. | 350/331 X |
| 3,923,370 | 12/1975 | Mostrom | 350/55 |
| 3,936,162 | 2/1976 | Krakau | 351/17 |
| 3,936,605 | 2/1976 | Upton | 351/50 X |
| 3,944,350 | 3/1976 | Yevick | 353/27 R |
| 3,947,840 | 3/1976 | Craford | 313/500 X |
| 4,026,641 | 5/1977 | Bosserman | 350/174 X |

*Primary Examiner*—Edward S. Bauer
*Attorney, Agent, or Firm*—Douglas Clarkson; Linn J. Raney; Jeff Rothenberg

[57] ABSTRACT

A field of view display for presenting data in focus on a subject's far field of view is disclosed. The display comprises an optically transparent viewing medium interposed between a subject and the subject's far field of view. Display units are attached to or embedded in the medium for producing a visual signal to the subject which is small enough to allow substantially unobstructed viewing of the far field view. Focusing material connected to or comprising part of the medium between the subject and the display units brings the display units into focus on the subject's field of view.

15 Claims, 6 Drawing Figures

HEAD-UP VIEWING DISPLAY

FIELD OF THE INVENTION

The present invention relates to information displays and more particularly relates to so-called "head-up" information displays.

PRIOR ART

Vehicles such as airplanes and automobiles have traditionally included control panels for supporting instrumentation displays. When vehicle speeds were low the subject operating the vehicle could conveniently divert his attention from the far field of view to observe information on the control panel. As the speeds of such vehicles increased, the grouping, location and type of displays were altered to facilitate more efficient viewing by the subject.

When switching attention from the far field of view to the control panel the subject had to shift his eyes and/or move his head and refocus his eyes to view the plane of the control panel. Once information on the control panel was viewed, the subject had to reverse these processes to return his attention to his far field of view. In high speed aircraft, the time required for the subject to shift attention and focus to displays and back to flight path, while brief, was felt to be too long.

To overcome this problem various "head-up" displays were proposed. Head-up displays were so named because the subject could view control panel type information without moving his head or changing eye focus from infinity.

One head-up display used a helmet or headmounted display which included a visor having a partially reflecting portion through which the subject observed his far field of view. Images of the display information were transmitted to the reflective surface and reflected to the subject. Since the visor portion was only partially reflective, the subject could also view the far field "through" the image of the information display. This head-up display produced some impairment of the subject's ability to see the far field and required the subject to frequently alternate his eye focus between the far field of view and the display image.

A typical refocus time period for a subject would be on the order of one-half to three-quarters of a second. During this time a supersonic aircraft may travel one-half mile. Lack of concentration on the far field of view even for the short time the subject is focusing his eyes can therefore quite significantly affect his flying performance.

One prior art proposal addressing the focus-refocus delay problem is disclosed in U.S. Pat. No. 3,936,605 to Upton. That patent discloses an arrangement whereby an information containing image located outside the subject's field of view is reflected to his eyes by small non-planar mirrors located on a helmet visor. The information image is located at or near the focal plane of the non-planar mirrors so that the image reflected to the subject appears to be coming from the subject's far field of view.

Although the use of reflecting mirrors within the operator's field of view addressed the focusing problem, it did so in a manner susceptible to design and maintenance problems. The mirrors would have to be carefully aligned and vibrations could upset that alignment causing the reflected image within the subject's view to be something other than the information to be conveyed. When no information was being transmitted the imaging device and its background would continually be presented to the subject thereby interfering with his far field of view. Small mirrors of the character required were difficult and costly to fabricate. The presence of foreign matter on the mirror could cause reduced reflection efficiency and regular cleaning tended to introduce misalignments.

SUMMARY OF THE INVENTION

The present invention provides a new and improved display for superimposing display information, in focus, on a subject's field of view, which is of relatively simple, easily fabricated construction, not readily subject to optical misalignments and minimizes interference with the subject's vision, particularly when no information is being displayed.

In a preferred form the new display comprises an optically transparent medium interposed between a subject and the subject's far field of view. One or more display units are attached to the medium for producing a visual signal. The display units can be small enough to allow substantially unobstructed viewing of the far field of view. The display further comprises one or more focusing elements connected to the medium for optically coupling the display units and the subject's eyes so that units are in focus at a plane other than the physical plane of the display unit.

In one preferred embodiment of the display the medium is a visor through which the subject can view his far field of view. In this embodiment the display unit provides one or more alphanumeric symbols which convey information to the operator. These symbols are generated by a composer, and conveyed to the display unit by a transmitter and receiver; the display is powered by an energy source outside the operator's field of view. The individual display units may conveniently comprise light emitting diodes, liquid crystal devices or other display devices. The size of an individual display unit is limited to approximately fifteen minutes of arc so the display units do not substantially interfere with the operator's far field viewing, yet are quite legible.

The transmission areas are preferably convex lenses through each of which one or more of the alphanumeric symbols is viewed. The symbol's image distance is controlled by the position of the symbol relative to the lenses. When positioned at or near the focal point of the lenses the symbols appear to originate from the far field, allowing the operator to receive information from those symbols without refocusing his eyes. If the subject is normally focusing at a distance less than infinity, the display unit is positioned to bring the symbol into focus in the plane where the subject's attention is focused.

The convex lenses are preferably constructed from the viewing medium material, i.e. the lenses are formed from the same piece of glass or plastic as the viewing medium. When the lenses are integrated with the viewing medium, misalignment problems are eliminated.

Other features and advantages of the invention will become more apparent as the invention becomes better understood from the detailed description that follows, when considered in connection with the accompanying drawings.

DETAILED DESCRIPTION OF THE INVENTION

Figure 1:
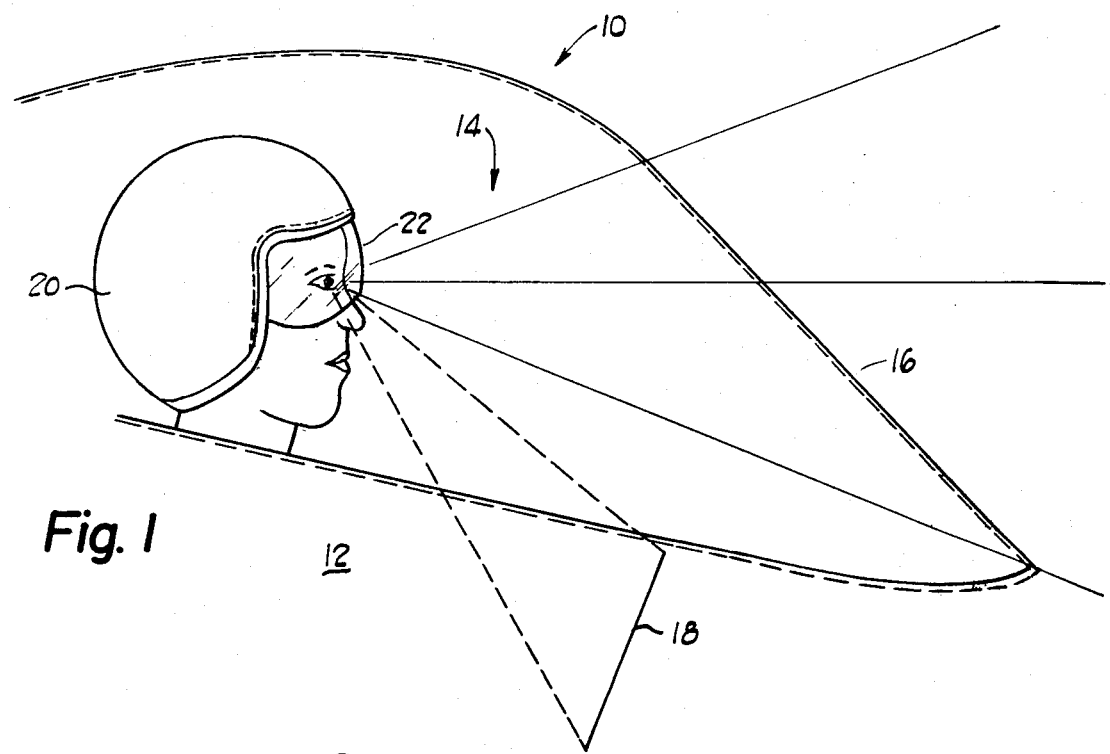
FIG. 1 schematically shows a portion of an aircraft piloted by a subject utilyzing the present invention.

An example of one possible environment in which the invention can be utilized is illustrated by FIG. 1 in which a portion of an aircraft 10 is shown schematically. The aircraft 10 is illustrated as including a fuselage 12 defining a cockpit area 14 enclosed by a canopy 16. The cockpit is equipped with a control panel 18, schematically illustrated, upon which instrumentation displays of various sorts are mounted. The aircraft pilot (referred to here as the subject) is seated in the cockpit area in a position to visualize a far field of view through the optically transparent medium forming the canopy. The subject can also shift his view to the control panel 18 but this normally requires head and eye movement as well as changing his eye focus which may be undesirable.

According to the present invention, a new and improved information display system is provided which superimposes display information, in focus, on the subject's far field of view. The system thereby maximizes the subject's ability to concentrate on the far field of view while making use of information produced by instrumentation. In the illustrated embodiment of the invention the system is mounted and supported by a flight helmet 20 worn by the subject.

Figures 2A, 2B:
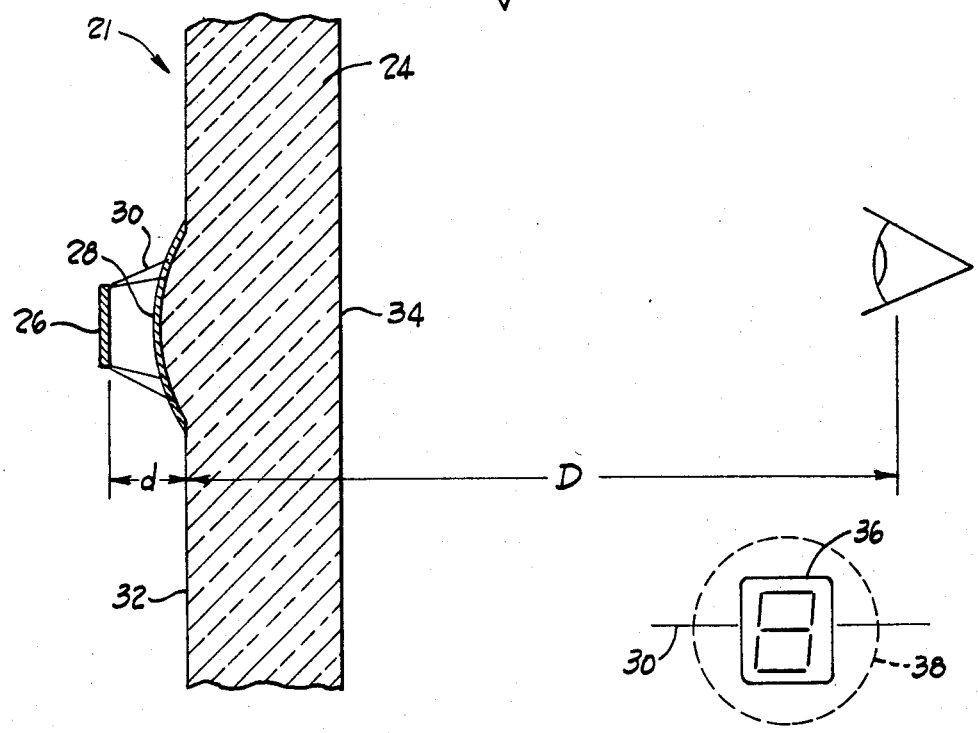
FIG. 2A is a cross sectional view seen approximately from the plane indicated by the line 2A—2A of FIG. 5.
FIG. 2B shows a segmented digital display unit.

As seen in FIG. 2A, the system 21 comprises an optically transparent viewing medium 24 which in the embodiment illustrated is a portion of a helmet visor 22. Attached to that medium is a typical display unit 26 for conveying information to the subject and a focusing arrangement 28 for bringing the display unit into focus on the subject's far field of view. The display unit 26 is maintained in position by means of a supporting structure 30 constructed from clear plastic struts of small width which minimally disrupt the subjects view. The subject is shown viewing the display 21 from a distance D.

The display unit comprises either a numeric or alphanumeric display which either individually or in combination with other display units sends information to the subject. The illustrated embodiment employs a liquid crystal device for fabrication of the display unit. Liquid crystals are characterized by the phenomena that when they are turned off or deactivated they are not visible to the subject and therefore do not overly distract the subject while viewing his far field of view.

Seen in FIG. 2B is a typical display unit. One digit display 36 is shown behind a single focusing arrangment 38 and is mounted by a support structure 30. If only numeric displays such as the one shown in FIG. 2B are to be utilized, a segmented symbol of seven liquid crystal devices forms that digit. If, however, alpha-numeric units are to be utilized, one display unit would comprise a 16 segment or dot matrix display. By altering the relative size of the display unit and focusing arrangement more than one unit can be mounted to utilize the focusing arrangement 38.

In a preferred embodiment, the focusing arrangement comprises one or more convex lenses through which the display units are viewed. Depending upon the amount of information to be conveyed to the subject, more than one lens may be conveniently arranged in front of the subject's field of view. The lens or lenses may comprise material similar to the transparent medium 24 of the visor. As shown in FIG. 2A, the lenses are convex with a positive radius of curvature. Although the lens is shown on an outside surface 32 of the visor away from the subject, it is possible that the lens could be mounted on an inside surface 34 facing the subject.

The display unit 26 and the focusing arrangement 28 co-operate to send information from the display unit to the subject so that the image of the display unit appears to be coming from the subject's far field of view. The display unit and the focusing arrangement are located a distance d apart. For a convex lens focusing unit, if the distance d is chosen to be the focal length of the lens, the display unit's image will appear to be coming from the far field of subject viewing. If the distance d is chosen to be less than the focal length of the lens, the display unit will appear to be transmitting an image to the subject from a distance less than the far field of view. Therefore, if it is necessary for the subject to maintain his attention on a control panel or other plane closer than his far field of view, the distance d can be adjusted by alteration of the support structure design to cause the information from the display unit to appear to originate in that plane.

The lens or focusing arrangement shown in FIG. 2A comprises a portion of the transparent viewing medium. When this design is chosen the lens is not susceptible to misalignment from vibrations of the system. It should be appreciated by one skilled in the art, however, that the lens material may be designed to temporarily attach to the viewing media and therefore form part of a temporary information display. In this temporary configuration both the display unit 26 and support 30 would also be temporarily attached to the medium 24.

Figure 3:
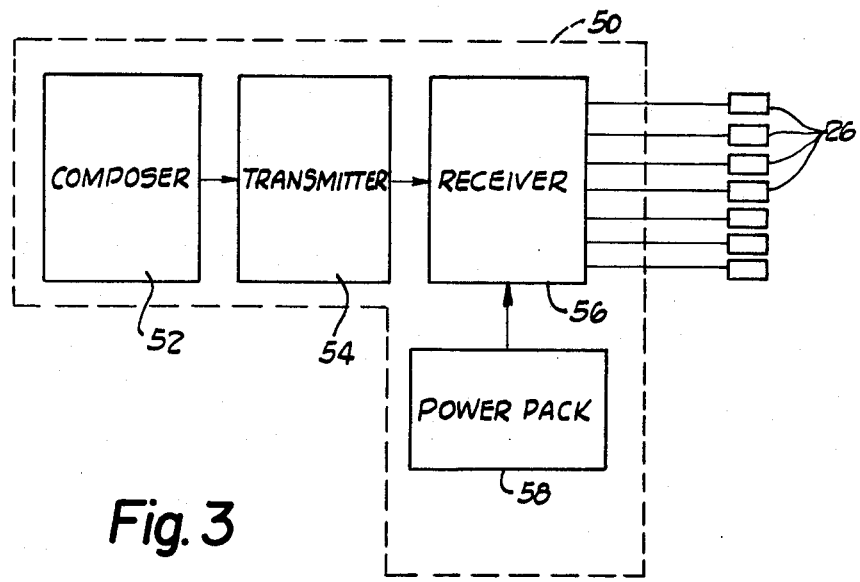
FIG. 3 shows in schematic form control circuitry for transmitting information to the subject.

Shown in FIG. 3 is a schematic diagram of a display control system 50 which controls the operation of the display units 26 also shown in FIG. 3. The system 50 comprises a message composer 52, a transmitter 54, a receiver 56, and a power pack 58. These components cooperate to activate the display units 26 in such a way that information is transmitted to the subject.

The message composer 52 instructs the transmitter 54 what signals should appear on the display. The composer might comprise a computer, mini-computer or similar control module.

The transmitter 54 sends signals to the receiver in response to instructions sent to it by the composer 52. The composer 52 and transmitter 54 would not typically be mounted to the subject and therefore would not interfere with his movement.

The receiver 56 activates the display units 26 in response to signals sent to it by the transmitter 54. The receiver as well as the display units are powered by a power pack 58. The combination of power pack and receiver is mounted to the subject in a convenient manner but exterior the subject's field of view.

Figure 4:
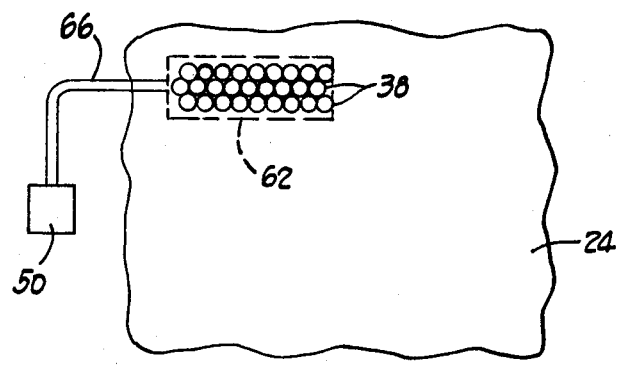
FIG. 4 shows a portion of the subject's visor as shown in FIG. 1.
Figure 5:
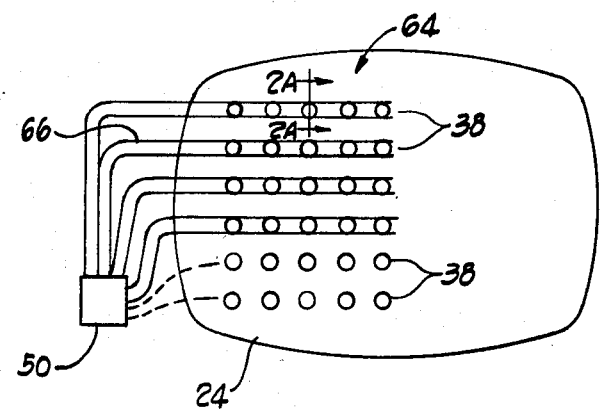
FIG. 5 shows an alternate construction of the visor portion of FIG. 4.

FIGS. 4 and 5 display two different configurations for positioning the display units within the subject's field of view. The display of FIG. 4 shows the lenses 38 mounted in an abutted configuration 62. The display shown in FIG. 5 shows the lenses 38 in a spaced apart configuration 64.

In both configurations the lenses 38 are positioned in front of only one eye of the subject allowing the other eye to see a substantially unimpaired view of the far field.

To the side of the viewing media 24 in FIGS. 4 and 5 is located a control system 50. The system controls activation of the display units and must therefore be electrically connected to each of the display units. To accomplish this interconnection, wiring 66 must enter the subject's field of view. In the abutted configuration 62, the wiring enters at one location and is multiplexed to the individual display units in a rather concentrated area. In the spaced apart configuration 64, the wiring is arranged in horizontal rows. In both configurations, very fine wire should be used to avoid distraction to the subject. It should be clear that the designs of FIGS. 4 and 5 are illustrative and that modifications in information display arrangement with the subject's field of view could be utilized.

While the system has been described in relation to an airplane pilot environment, it is possible to use the invention in other environments. Divers, for example, might utilize a similar arrangement to receive signals from the surface during working dives. It also might be possible to mount the display units and lenses temporarily to one's glasses with a head mounted receiver and power pack to receive signals from the transmitter. It is therefore apparent, that while a preferred embodiment of the present invention has been described with particularity, it should be understood that one skilled in the art could modify and alter the invention without departing from its spirit or scope as set forth in the appended claims.

What is claimed is:

1. A field of view display by which a subject can view display data which is in focus on a far field of view comprising:
    (a) an optically transparent viewing medium interposed between a subject and the subject's far field of view, said medium mechanically coupled to the subject's head in order that movement of the head produces corresponding movement of said medium;
    (b) electrically controllable display means attached to said medium in the field view of said subject for transmitting information to the subject, said display means occupying a relatively small angular area of said medium for permitting substantially unobstructed viewing of the far field of view; and
    (c) focusing means connected to the medium between the subject and said display means, said focusing means operative to bring the display means into focus to the subject so that information transmitted by the display means is superimposed in focus on the subject's field of view.

2. The display of claim 1 which further comprises a helmet worn by the subject and in which the transparent viewing medium is attached to said helmet to coordinate head movement with medium movement.

3. The display of claim 1 wherein the attached display means are located sufficiently near the subject's eyes to insure they would remain out of focus but for the presence of the focusing means.

4. The display claimed in claim 3 wherein said focusing means is optically transparent and itself remains out of focus to the subject.

5. The display claimed in claim 1 wherein said display means comprises a plurality of electrically actuated alphanumeric display elements, said focusing means comprising a plurality of lenses each associated with a respective display element.

6. The display claimed in claim 5 wherein each display element is positioned at or near the focal point of its respective lens.

7. A field of view display for displaying data in focus on a subject's distant field of view comprising:
    (a) an optically transparent medium mechanically coupled to the subject's head and interposed between the subject and the subject's distant field of view;
    (b) electrically controllable display means attached to said medium in the field of view of the subject for producing a visual signal to the subject, said display means being small enough to allow substantially unobstructed viewing of the far field of view; and
    (c) focusing means optically coupled to the medium and positioned between the subject and the display means, said transmission means being operative to bring the display means into focus at a more distant plane than the physical plane of the display means.

8. The visual display of claim 7 wherein the display means comprise an externally controlled visual unit with an on state in which information is being conveyed and an off state in which information is not being conveyed.

9. The visual display of claim 8 wherein the externally controlled visual unit comprises one or more light emitting diodes.

10. The visual display of claim 7 wherein the externally controlled visual unit comprises one or more liquid crystal devices.

11. The visual display of claim 8 wherein the transmission means comprises one or more convex lenses forming part of the medium and disposed away from the subject.

12. The visual display of claim 11 wherein the display means are disposed away from convex lens a distance approximately equal to the focal length of said lens.

13. A method for supplying information to a subject's field of view comprising the steps of:
    (a) interposing a transparent medium between the subject and the field of view and mechanically coupling the medium to the subject's head;
    (b) optically coupling one or more convex lenses to the transparent medium, the solid viewing angle subtended by said lenses being small enough to insubstantially interfere with the subject's viewing; and
    (c) causing the light rays from an electrically controllable information conveying means located in the field of view of the subject and attached to said medium to pass through said convex lenses in such a way that the information conveying means appears in focus at a more distant plane than the actual physical plane of the information conveying means.

14. The method of claim 13 wherein the convex lenses are arranged in a matrix of lenses; the matrix comprising a number of abutting lenses.

15. The method of claim 13 wherein the convex lenses are arranged in a matrix of lenses; the matrix comprising spaced lenses.

* * * * *